(12) United States Patent
Kojima

(10) Patent No.: US 10,346,039 B2
(45) Date of Patent: Jul. 9, 2019

(54) MEMORY SYSTEM

(71) Applicant: Toshiba Memory Corporation, Minato-ku (JP)

(72) Inventor: Yoshihisa Kojima, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 130 days.

(21) Appl. No.: 15/065,244

(22) Filed: Mar. 9, 2016

(65) Prior Publication Data

US 2016/0313922 A1 Oct. 27, 2016

Related U.S. Application Data

(60) Provisional application No. 62/150,430, filed on Apr. 21, 2015.

(51) Int. Cl.
  *G06F 12/00* (2006.01)
  *G06F 3/06* (2006.01)

(52) U.S. Cl.
  CPC ............ *G06F 3/0605* (2013.01); *G06F 3/061* (2013.01); *G06F 3/064* (2013.01); *G06F 3/0659* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 8,266,396 B2 | 9/2012 | Yano et al. | |
| 8,640,129 B2 | 1/2014 | Cismas et al. | |
| 9,690,491 B2 * | 6/2017 | Sinclair | G06F 3/064 |
| 2004/0196707 A1 * | 10/2004 | Yoon | G06F 12/0246 365/200 |
| 2006/0282610 A1 | 12/2006 | Dariel et al. | |
| 2011/0225347 A1 * | 9/2011 | Goss | G06F 12/0246 711/103 |
| 2012/0030413 A1 | 2/2012 | Miyagawa et al. | |
| 2012/0079167 A1 * | 3/2012 | Yao | G06F 12/0246 711/103 |
| 2013/0054928 A1 * | 2/2013 | Im | G06F 12/0246 711/170 |

(Continued)

FOREIGN PATENT DOCUMENTS

| | | |
|---|---|---|
| JP | 2009-503629 A | 1/2009 |
| JP | 2011-197788 | 10/2011 |
| JP | 2013-41547 | 2/2013 |

*Primary Examiner* — Prasith Thammavong

(74) *Attorney, Agent, or Firm* — Oblon, McClelland, Maier & Neustadt, L.L.P.

(57) ABSTRACT

According to one embodiment, a memory system includes a memory and a controller. The memory includes a plurality of blocks. The controller receives a first data group and a second data group from a host. The controller stores the first data group to a first block group, and stores the second data group to a second block group. The first block group includes one or more first blocks among the plurality of blocks. The second block group includes one or more second blocks among the plurality of blocks. The controller controls the number of first blocks so that the number of the first blocks is not more than a first value, and the controller controls the number of second blocks so that the number of the second blocks is not more than a second value.

21 Claims, 13 Drawing Sheets

(56) References Cited

U.S. PATENT DOCUMENTS

| | | | |
|---|---|---|---|
| 2013/0067138 A1* | 3/2013 | Schuette | G06F 3/0616 |
| | | | 711/103 |
| 2013/0103893 A1* | 4/2013 | Lee | G06F 12/0246 |
| | | | 711/103 |
| 2014/0025864 A1* | 1/2014 | Zhang | G06F 12/0246 |
| | | | 711/103 |
| 2014/0173268 A1 | 6/2014 | Hashimoto | |
| 2016/0041762 A1 | 2/2016 | Kanno et al. | |
| 2016/0179371 A1* | 6/2016 | Sinclair | G06F 3/064 |
| | | | 711/103 |

* cited by examiner

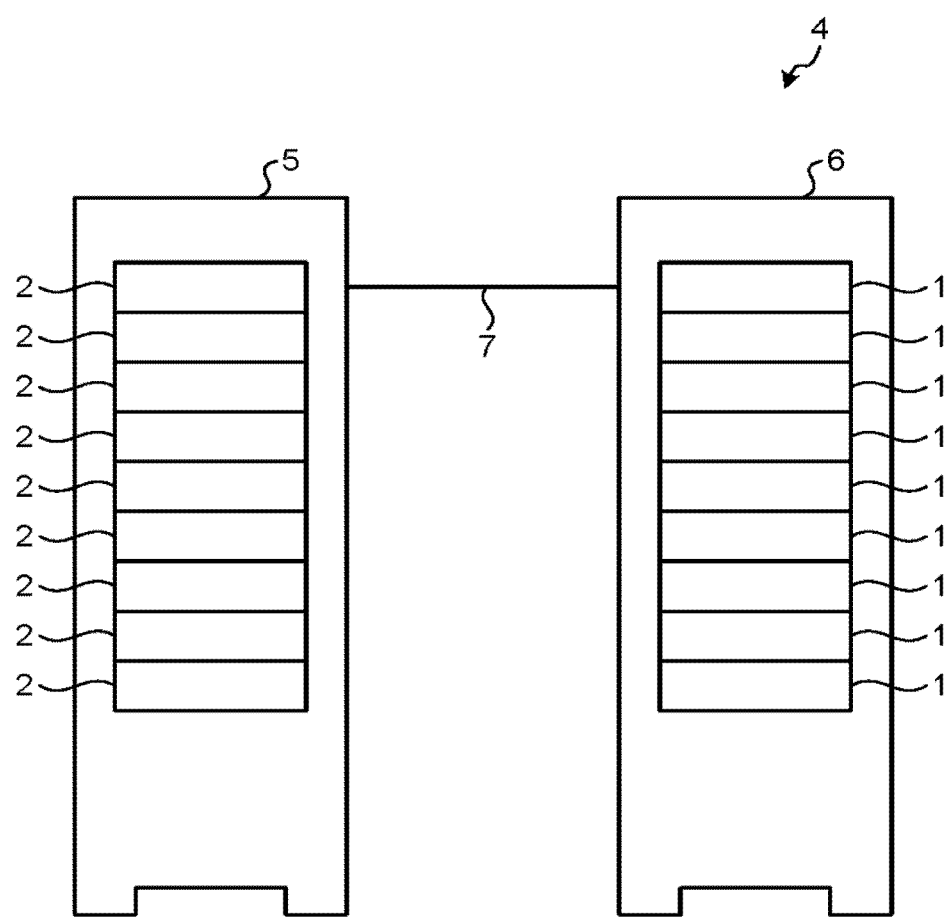

MEMORY SYSTEM

CROSS-REFERENCE TO RELATED APPLICATIONS

This application is based upon and claims the benefit of priority from U.S. Provisional Application No. 62/150,430, filed on Apr. 21, 2015; the entire contents of which are incorporated herein by reference.

FIELD

Embodiments described herein relate generally to a memory system.

BACKGROUND

In recent years, a memory system including a non-volatile memory is known. The memory system internally executes moving of data. Therefore, total quantity of data written to the non-volatile memory is more than total quantity of data written from a host to the memory system. A ratio of the total quantity of data written to the non-volatile memory with respect to the total quantity of data written from the host to the memory system is desired to be reduced as much as possible.

BRIEF DESCRIPTION OF THE DRAWINGS

FIG. 13 is a diagram illustrating an implementation example of a memory system.

DETAILED DESCRIPTION

In general, according to one embodiment, a memory system includes a memory and a controller. The memory includes a plurality of blocks. The controller receives a first data group and a second data group from a host. The controller stores the first data group to a first block group, and stores the second data group to a second block group. The first block group includes one or more first blocks among the plurality of blocks. The second block group includes one or more second blocks among the plurality of blocks. The controller controls the number of first blocks so that the number of the first blocks is not more than a first value, and the controller controls the number of second blocks so that the number of the second blocks is not more than a second value.

Exemplary embodiments of a memory system will be explained below in detail with reference to the accompanying drawings. The present invention is not limited to the following embodiments.

First Embodiment

Figure 1:
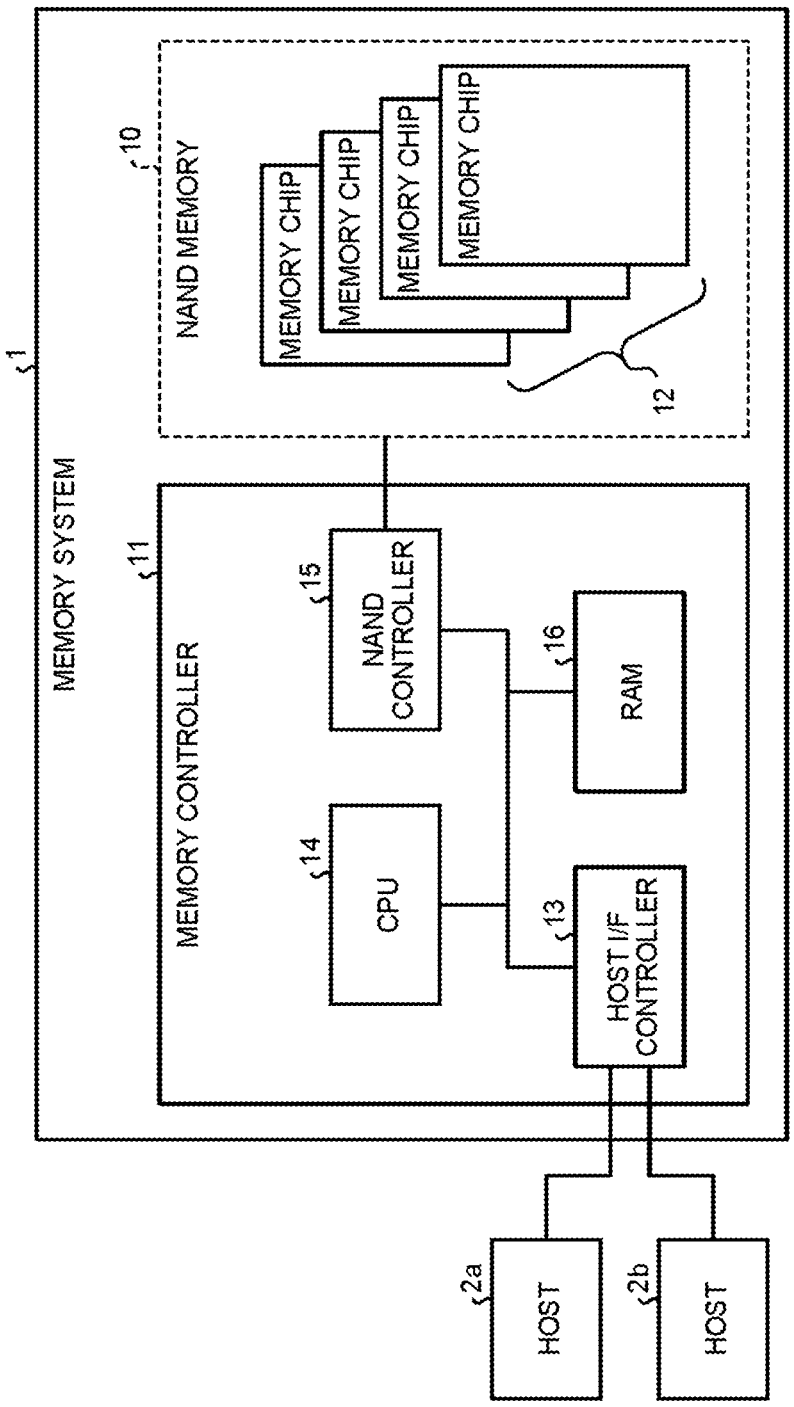
FIG. 1 is a diagram illustrating a configuration example of a memory system according to a first embodiment.

FIG. 1 is a diagram illustrating a configuration example of a memory system according to the first embodiment. The memory system 1 is connected to two hosts (a host 2a and a host 2b in FIG. 1) via connection lines. The host 2a and the host 2b are collectively referred to as the hosts 2. The host 2 corresponds to, for example, a personal computer, a server computer, a CPU (Central Processing Unit), or the like. The memory system 1 can receive an access command (write command and the like) from the host 2. The access command includes address indicating an access destination in the memory system 1.

The memory system 1 includes a NAND-type flash memory (NAND memory) 10 and a memory controller 11 executing data transfer between the host 2 and the NAND memory 10. It should be noted that the memory system 1 may have any non-volatile memory instead of the NAND memory 10. For example, the memory system 1 may have a NCR-type flash memory instead of the NAND memory 10.

The NAND memory 10 is configured to include one or more memory chips 12. Each memory chip 12 includes multiple blocks. Each of the blocks is a unit of erase processing. Each block includes multiple pages. Each of the pages is a unit of program processing and read processing.

The memory system 1 can receive multiple data groups. A data group is a group including multiple data. Each of the multiple data is data of which writing is requested by a respectively different write command. The memory controller 11 manages multiple blocks provided in the NAND memory 10 in such a manner that the multiple blocks are divided into multiple block groups. Hereinafter each block group will be denoted as a thread. The controller 11 associates a data group and a thread in a one-to-one manner. The controller 11 stores data of which writing has been requested by the write command to a thread associated with a data group to which the data belongs. The data group to which the data belongs can be identified according to any method.

Figure 2:
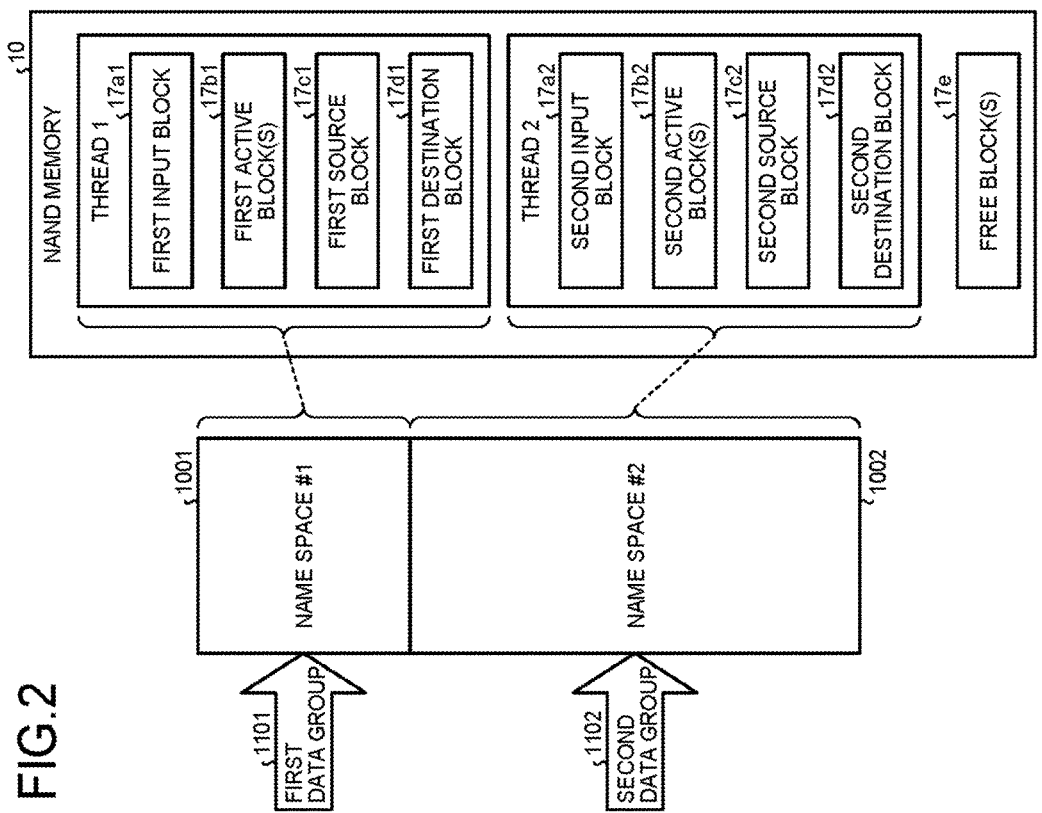
FIG. 2 is a diagram for explaining a thread.

FIG. 2 is a diagram for explaining a thread. In the first embodiment, the memory system 1 is based on NVMe (R) standard. According to the NVMe (R) standard, multiple name spaces can be set to a device (which is referred to as the memory system 1 in this embodiment). Each name space is a logical address space independent from each other. The logical address space is a range of logical address that can be designated from the outside (the host 2 in this embodiment) of the memory system 1. Each name space is attached with a name space ID. The address provided in the write command includes a name space ID and a logical address in a logical address space identified by the name space ID. In this case, the memory controller 11 identifies a data group to which data requested to be written by the write command belongs, on the basis of the name space ID provided in the write command.

In the example of FIG. 2, the memory system 1 includes a logical add space 1001 of a name space #1 and a logical address space 1002 of a name space #2. The memory controller 11 classifies data of which write destination is the logical address space 1001 of the name space #1 into a first data group 1101, and classifies data of which write destination the logical address space 1002 of the name space #2 into a second data group 1102. The memory controller 11 associates the first data group 1101 with the thread 1, and associates the second data group 1102 with the thread 2.

Each thread includes an input block 17a, one or more active blocks 17b, a source block 17c, and a destination block 17d. It should be noted that the input block 17a constituting the thread i will be denoted as the i-th input block 17ai. The active block(s) 17b constituting the thread i will be denoted as the i-th active block(s) 17bi. The source block 17c constituting the thread i will be denoted as the i-th source block 17ci. The destination block 17d constituting the thread i will be denoted as the i-th destination block 17di. More specifically, the thread 1 includes a first input block 17a1, one or more first active blocks 17b1, a first source block 17c1, and a first destination block 17d1. The thread 2 includes a second input block 17a2, one or more second active blocks 17b2, a second source block 17c2, and a second destination block 17d2.

The input block 17a is a block having a vacant page, and is a block to which data received from the host 2 are written. The active block 17b is a block in which data are written to all the pages, and is a block storing valid data.

The memory controller 11 executes erase processing on the NAND memory 10 in units of blocks. While first data are held in one of the one or more active blocks 17b, when second data with designation of the same address as the first data are received, the memory controller 11 writes the second data to the vacant page of the input block 17a, regards the first data as invalid data and regards the second data as valid data. Similarly, even when an UNMAP command designating the same address as the first data is received, the memory controller 11 regards the first data as invalid data. When writing of data to all the pages of the input block 17a is completed, the memory controller 11 regards the input block 17a as the active block 17b. Then, a vacant block is set as a new input block 17a.

It should be noted that the "vacant" state is a state in which none of invalid data or valid data are stored. "Data is valid" means that the data in the NAND memory 10 is in the latest state in the memory system 1. In a case where multiple data designating the same address are held in the NAND memory 10, the latest state means a state of one of the multiple data that was last written to the NAND memory 10. It should be noted that writing to the NAND memory 10 includes writing caused by the garbage collection (GC). The invalid data means data other than one of the multiple data that was last written to the NAND memory 10.

Writing to the NAND memory 10 is performed according to the above writing method, and therefore, the quantity of invalid data in the data stored in each active block 17b increases as the writing has been performed. When the writing has been performed, this will result in lack of free blocks that can be set as an input block 17a after the erase processing. Therefore, the memory controller 11 executes the garbage collection.

The garbage collection is processing for generating a free block 17e. The free block 17e is a block not storing valid data and is a block excluding the input block 17a. The free block 17e can be used as the input block 17a after the erase processing. In the garbage collection, the memory controller 11 copies at least all the valid data from one active block to another block. After copying, the memory controller 11 regards all the data stored in the one block as invalid data, and regards the one block as a free block 17e. Upon the garbage collection, the memory controller 11 selects a copy-source block (source block 17c) from among one or more active blocks 17b. The memory controller 11 sets one of the one or more free blocks 17e as a copy-destination block (destination block 17d). The destination block 17d after the erase processing corresponds to a vacant block.

Figure 3:
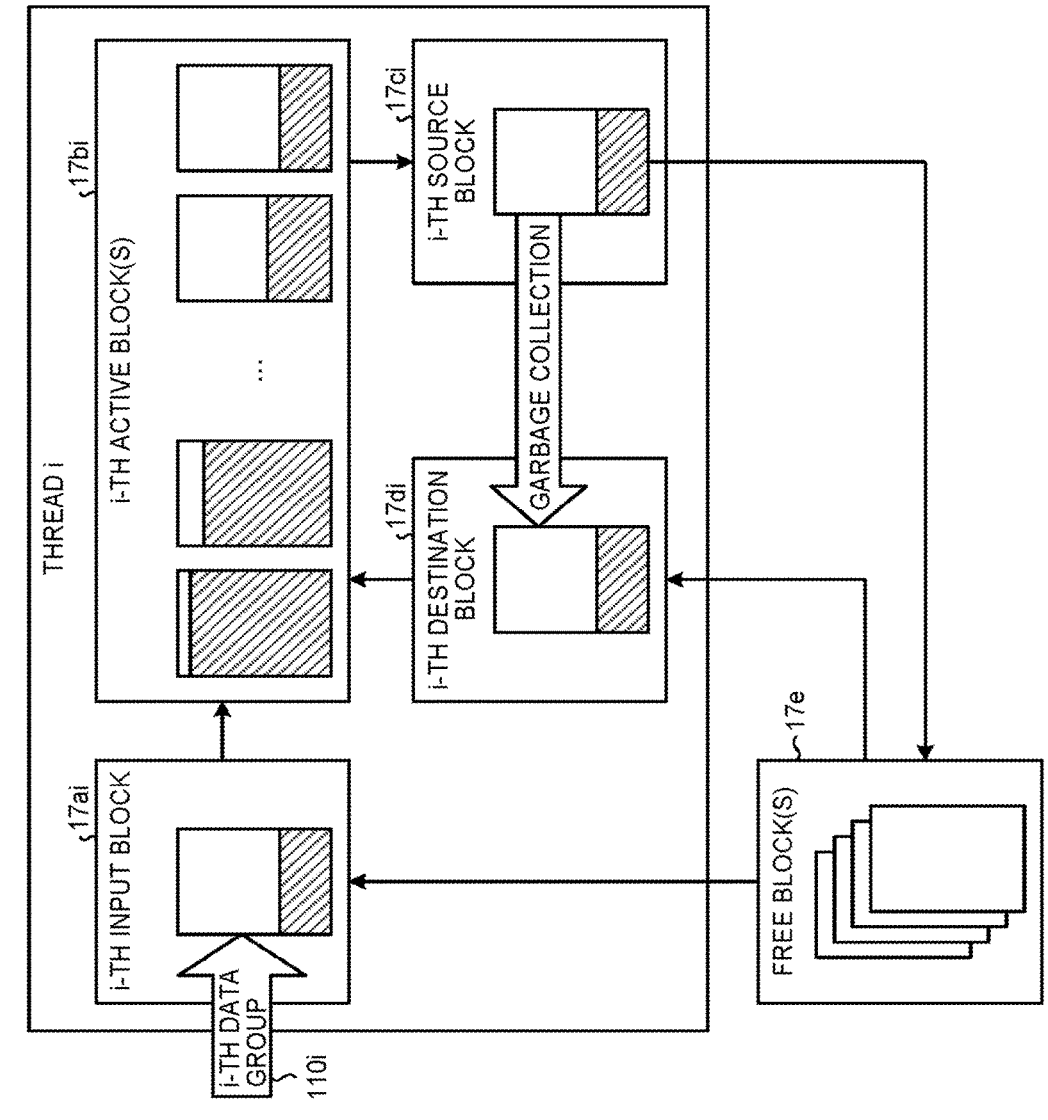
FIG. 3 is a diagram for explaining garbage collection according to the first embodiment.

FIG. 3 is a diagram for explaining garbage collection according to the first embodiment. In the embodiment, the memory controller 11 executes the garbage collection in each thread. "Executing the garbage collection in each thread" means that valid data of data written to a thread i are copied only between the blocks which belong to the identical thread i. More specifically, this is what will be explained below.

More specifically, the memory controller 11 writes the data received as the i-th data group 110i to a vacant page of the i-th input block 17ai. After the data have been written to all the pages of the i-th input block 17ai the memory controller 11 sets the i-th input block 17ai as a new i-th active block 17bi. Then, the memory controller 11 executes the erase processing on a free block 17e, and sets the free block 17e, which has been subjected to the erase processing, as a new i-th input block 17ai. In FIG. 3, the size of shadow area in each block indicates the quantity of valid data stored in the block.

In the garbage collection, the memory controller 11 selects the i-th active block 17bi from the one or more i-th active blocks 17bi. The memory controller 11 sets the selected i-th active block 17bi as the i-th source block 17ci. The memory controller 11 copies valid data from the i-th source block 17ci to the i-th destination block 17di. After all the valid data stored in the i-th source block 17ci have been copied, the memory controller 11 sets the i-th source block 17ci as a new free block 17e. After the data have been copied to all the pages of the i-th destination block 17di, the memory controller 11 sets the i-th destination block 17di as a new i-th active block 17bi. Then, the memory controller 11 executes the erase processing on a free block 17e, and sets the free block 17e, having been subjected to the erase processing, as a new i-th destination block 17di.

It should be noted that the memory controller 11 manages the numbers of free blocks in each thread, and a free block is consumed in another thread different from a thread where the free block has been generated. More specifically, the memory controller 11 can set the free block 17e, generated from a thread different from the thread i, as the i-th input block 17ai, or set the free block 17e as the i-th destination block 17di. In other words, the resource of the free block 17a is shared by multiple threads.

The explanation is returned to FIG. 1. The memory controller 11 includes a host interface controller (host I/F controller) 13, a CPU 14, a NAND controller 15, and a RAM (Random Access Memory) 16. The host I/F controller 13, the CPU 14, the NAND controller 15, and the RAM 16 are connected with each other via a bus.

The RAM 16 is used as a storage area for temporarily storing various kinds of data. The RAM 16 may be a DRAM (Dynamic Random Access Memory) or an SRAM (Static Random Access Memory). Instead of the RAM 16, any volatile or non-volatile memory of a higher speed than the NAND memory 10 can also be used.

Figure 4:
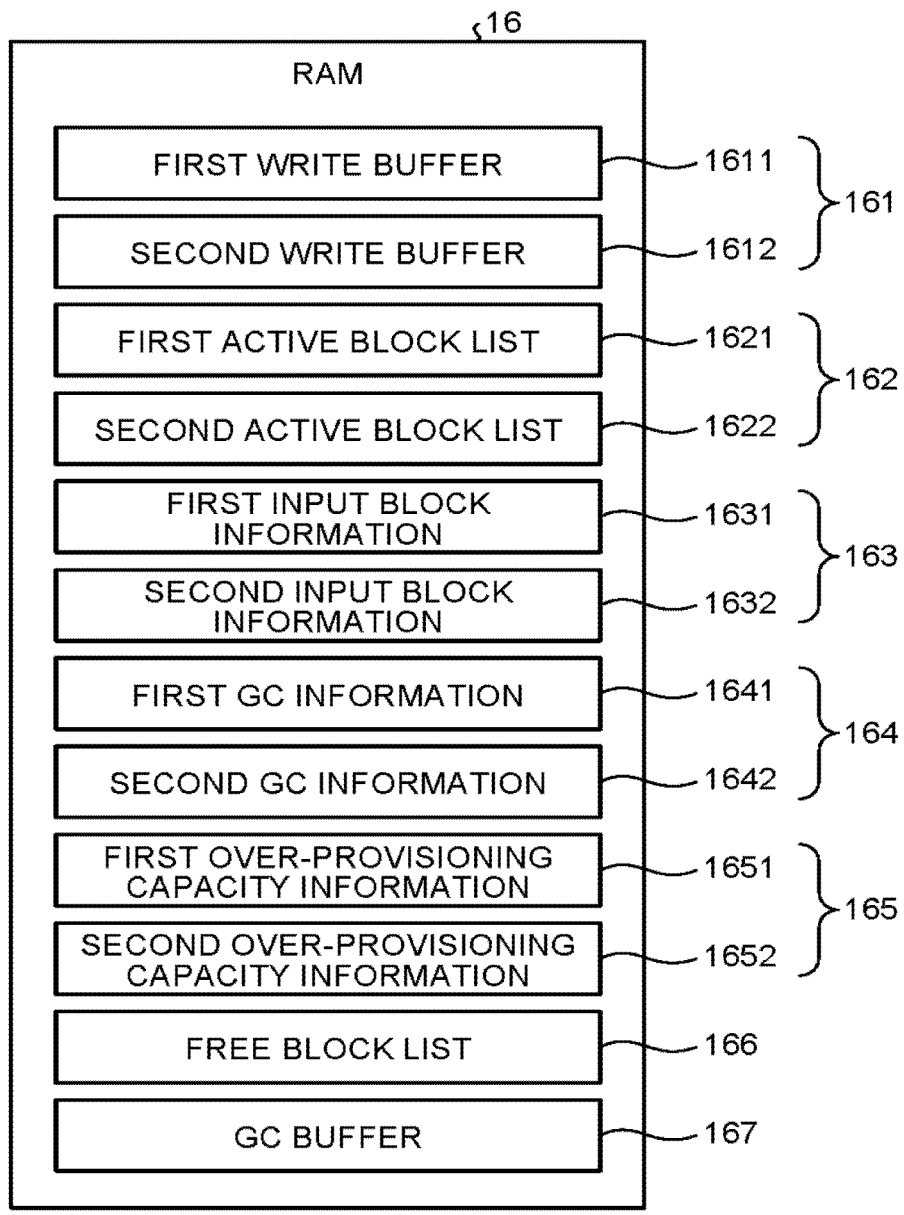
FIG. 4 is a diagram illustrating a configuration example of a memory of a RAM.

FIG. 4 is a diagram illustrating a configuration example of a memory of the RAM 16. The RAM 16 has write buffers

161 for each thread. A write buffer 161 for a thread i will be denoted as the i-th write buffer 161*i*. The RAM 16 stores, for each thread, an active block list 162, input block information 163, GC information 164, and over-provisioning capacity information 165. The active block list 162 for the thread i is denoted as the i-th active block list 162*i*, the input block information 163 for the thread i is denoted as the i-th input block information 163*i*, the GC information 164 for the thread i is denoted as the i-th GC information 164*i*, and the over-provisioning capacity information 165 for the thread i is denoted as the i-th over-provisioning capacity information 165*i*. In the example of FIG. 4, the memory system 1 is considered to include a thread 1 and a thread 2. More specifically, in the example of FIG. 4, the value of i is "1" or "2". The RAM 16 further stores the free block list 166. The RAM 16 further includes a GC buffer 167.

The i-th write buffer 161*i* is a buffer storing data of which write-destination is the thread i. More specifically, the memory controller 11 receives a write command from the host 2, inputs data from the host 2 in a write buffer 161 corresponding to a data group to which the data belongs, then transfer the data from the write buffer 161 to the NAND memory 10. The i-th active block list 162*i* is information for managing each of the i-th active blocks 17*bi* and is a list in which all the i-th active blocks 17*bi* are registered. The i-th input block information 163*i* is information indicating the i-th input block 17*ai*. The i-th GC information 164*i* is information in which the i-th source block 17*ci* and the i-th destination block 17*di* are registered. The i-th over-provisioning capacity information 165*i* is information recorded with an over-provisioning capacity allocated to the thread i.

An over-provisioning capacity is a value obtained by subtracting the user capacity of the memory system 1 from the physical capacity of the memory system 1. The user capacity of the memory system 1 is the total value of the sizes of all the logical address spaces provided to the host 2. The physical capacity of the memory system 1 is a size of storage area obtained by excluding a storage area required for saving ECC (Error Correction Code) and management information from the storage area including all the blocks provided in the NAND memory 10, and is the size (capacity) of the storage area provided to store user data. The user capacity of the memory system 1 is less than the physical capacity of the memory system 1. In general, the ratio of the quantity of data written to the NAND memory 10 according to the garbage collection and the quantity of data written to the NAND memory 10 according to the write command is in a correlation relationship with an over-provisioning percentage. A value obtained by dividing the quantity of data written to the NAND memory 10 according to the garbage collection (GC write quantity) by the quantity of data written to the NAND memory 10 according to the write command (host write quantity) is denoted as a write ratio. The over-provisioning percentage is a value obtained by dividing the over-provisioning capacity by the user capacity. In general, when the randomness of the write access is constant, there is a negative correlation relationship between the over-provisioning percentage and the write ratio. More specifically, the write ratio in the sustained state (steady state) when the over-provisioning percentage is high is less than the write ratio in the steady state when the over-provisioning percentage is low.

In the embodiment, the memory controller 11 manages the over-provisioning capacity of the memory system 1 upon distributing the over-provisioning capacity of the memory system 1 into each thread. Then memory controller 11 controls execution of the garbage collection for each thread on the basis of the over-provisioning capacity for each thread.

The free block list 166 is a list registered with all the free blocks 17*e* provided in the memory system 1.

The GC buffer 167 is a buffer used in the garbage collection. The GC buffer 167 temporarily stores the data read from the source block 17*c*.

The CPU 14 executes control of the entire memory controller 11 on the basis of a firmware. The host I/F controller 13 executes control of a communication interface with the host 2. The host I/F controller 13 executes data transfer between the host 2 and the RAM 16 under the control of the CPU 14. The NAND controller 15 executes data transfer between the NAND memory 10 and the RAM 16 under the control of the CPU 14.

Figure 5:
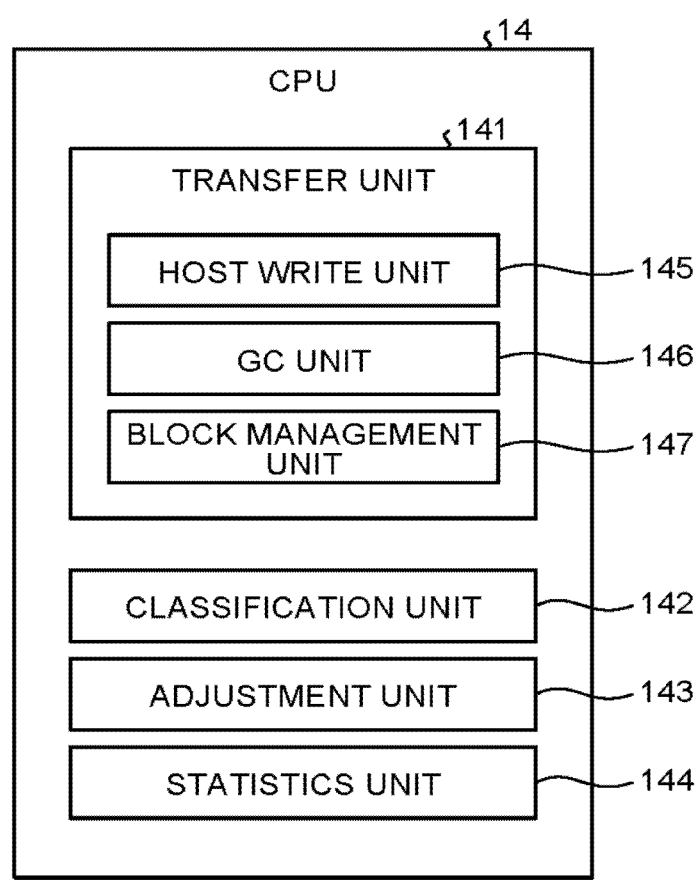
FIG. 5 is a diagram for explaining function configuration units.

FIG. 5 is a diagram for explaining function configuration units realized by the CPU 14 on the basis of the firmware. The CPU 14 includes a transfer unit 141, a classification unit 142, an adjustment unit 143, and a statistics unit 144. The transfer unit 141 includes a host write unit 145, a GC unit 146, and a block management unit 147. It should be noted that all or some of the classification unit 142, the adjustment unit 143, the statistics unit 144, the host write unit 145, the GC unit 146, and the block management unit 147 can be realized by hardware or a combination of hardware and software.

The classification unit 142 stores relation between data groups and threads. The classification unit 142 switches the write buffer 161 as the storing destination for the data which is requested to be written by the write command on the basis of the name space ID included in the input write command. More specifically, the classification unit 142 identifies the thread to which the input data belongs. The host I/F controller 13 stores the data, requested to be written by the write command, to the write buffer 161 indicated by the classification unit 142.

The host write unit 145 writes the data stored in the write buffer 161 to the input block 17*a* (host write). The host write unit 145 executes host write for each thread. The GC unit 146 executes garbage collection for each thread. The block management unit 147 executes management of the active block list 162, the input block information 163, the GC information 164, and the free block list 166. More specifically, the block management unit 147 updates the active block list 162, the input block information 163, the GC information 164, and the free block list 166 in accordance with the host write and the garbage collection.

The statistics unit 144 measures the host write quantity for each thread. In this case, the statistics unit 144 measures the host write quantity within a predetermined period of time. In the steady state, the host write quantity is equal to the quantity of data received from the host 2. The statistics unit 144 may measure the quantity of data received from the host 2 as the host write quantity for each thread. The statistics unit 144 may measure the quantity of data received by each write buffer 161 as the host write quantity for each write buffer 161.

The adjustment unit 143 calculates the over-provisioning capacity which is to be allocated to each thread on the basis of the host write quantity for each thread measured by the statistics unit 144. The adjustment unit 143 records, to the over-provisioning capacity information 165, the over-provisioning capacity for each thread calculated.

Subsequently, operation of the memory system 1 according to the first embodiment will be explained. In the explanation about the operation, the number of threads provided in the memory system 1 is considered to be "N". More specifically, the memory system 1 includes a thread 1 to a thread N.

Figure 6:
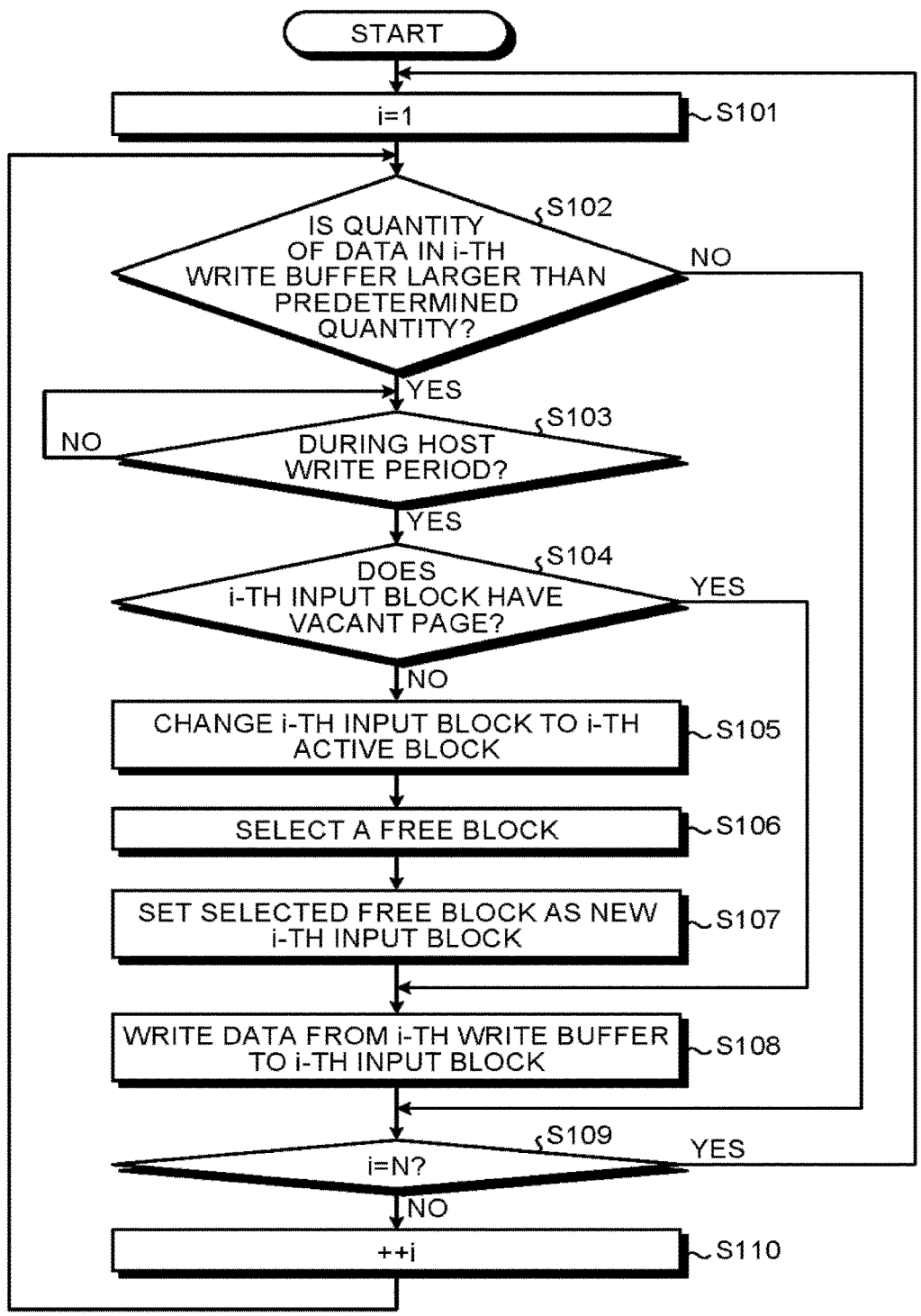
FIG. 6 is a flowchart for explaining processing of host write.

FIG. 6 is a flowchart for explaining processing of host write. First, the host write unit 145 initializes the index i used in the processing of FIG. 6 with "1" (S101). Then, the host write unit 145 determines whether the quantity of data stored in the i-th write buffer 161i is more than a predetermined quantity or not (S102). For example, the minimum size (unit size) of data that can be written into the NAND memory 10 is used as a threshold value for determination in S102. For example, the unit size equals to the size of a single page. When a logical page is constituted by multiple pages, the unit size may be set as the same size as the size of a single logical page. It should be noted that a value different from the unit size may be used as the threshold value for the determination in S102.

When the quantity of data stored in the i-th write buffer 161i is more than the predetermined quantity (S102, Yes), the host write unit 145 determines whether it is in a host write period or not (S103). The host write period is a period in which the host write can be executed. For example, in the host write period, the garbage collection is not executed. The host write period is set by processing with the GC unit 146 explained later.

When it is not in the host write period (S103, No), the host write unit 145 executes the determination processing of S103 again. When it is in the host write period (S103, Yes), the block management unit 147 determines whether the i-th input block 17ai has a vacant page or not (S104). When the i-th input block 17ai does not have any vacant page (S104, No), the block management unit 147 changes the i-th input block 17ai to an i-th active block 17bi (S105). More specifically, the block management unit 147 deletes the identification information of the block set as the i-th input block 17ai from the i-th input block information 163i, and adds the identification information of the block having been regarded as the i-th input block 17ai to the i-th active block list 162i.

Subsequently, the block management unit 147 selects a free block 17e (S106), and sets the selected free block 17e as an i-th input block 17ai (S107). More specifically, the block management unit 147 deletes the identification information about the selected block (block set as the free block 17e) from the free block list 166, and executes erase processing on the selected block. Then, the block management unit 147 records the identification information about the selected block to the i-th input block information 163i.

In a case where the i-th input block 17ai has a vacant page (S104, Yes), or after the processing of S107, the host write unit 145 writes the data stored in the i-th write buffer 161i to the i-th input block 17ai (S108). In the processing of S104, for example, the host write unit 145 writes data in the unit size to the i-th input block 17ai. The data which has been written to the NAND memory 10 is deleted from the i-th write buffer 161i.

In a case where the quantity of data stored in the i-th write buffer 161i is not more than the predetermined quantity (S102, No), or after the processing of S108, the host write unit 145 determines whether the value of i is equal to "N" or not (S109). When the value of i is determined to be equal to "N" (S109, Yes), the host write unit 145 executes the processing of S101 again. When the value of i is determined not to be equal to "N" (S109, No), the host write unit 145 increases the value of i by "1" (S110), and thereafter, executes the determination processing of S102 again.

Figure 7:
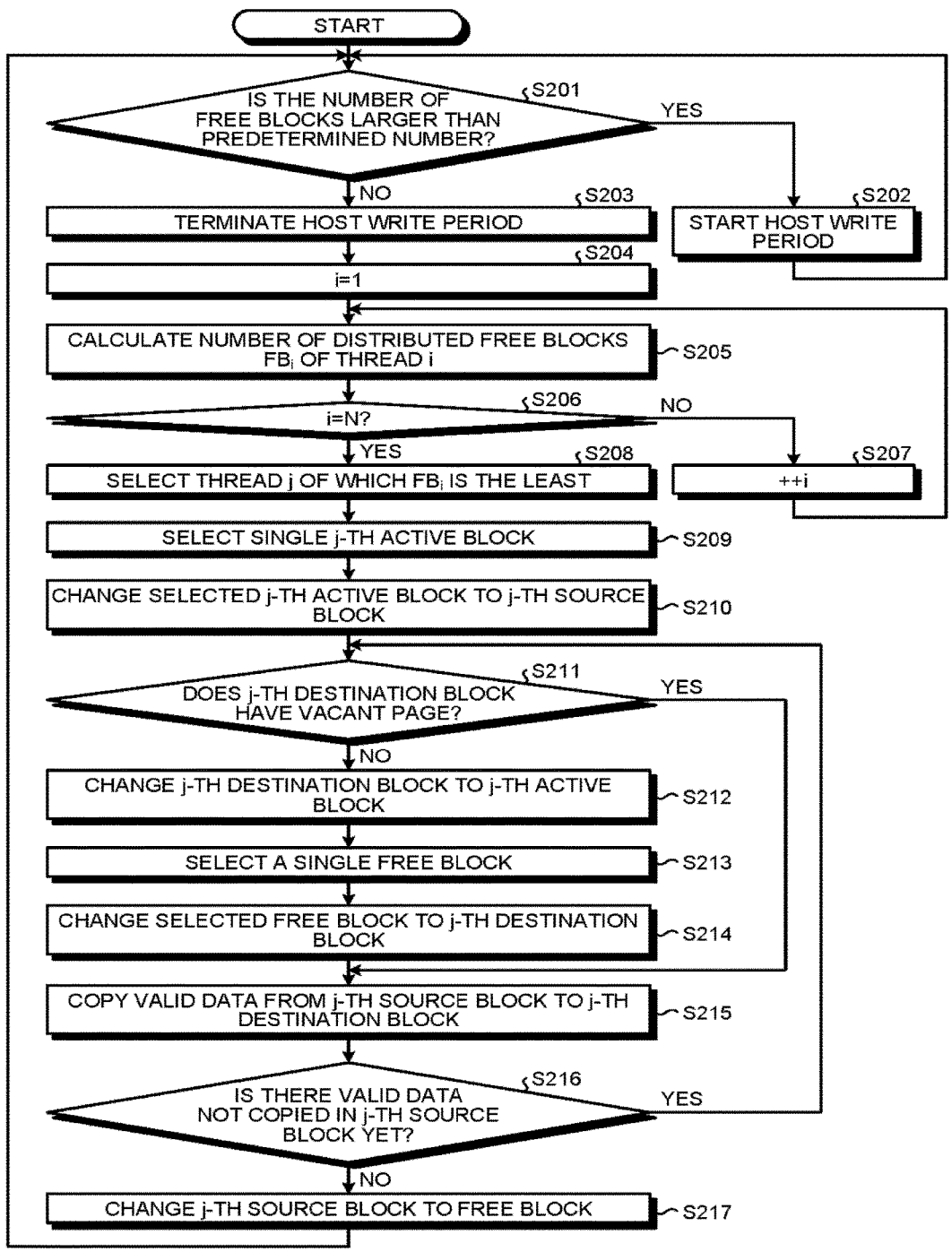
FIG. 7 is a flowchart for explaining the garbage collection.

FIG. 7 is a flowchart for explaining the garbage collection. First, the GC unit 146 determines whether the number of free blocks 17e is more than a predetermined number or not (S201). When the number of free blocks 17e is determined to be more than the predetermined number (S201, Yes), the GC unit 146 starts the host write period (S202). When the host write period is already started, the GC unit 146 continues the host write period in S202. When the number of free blocks 17e is determined not to be more than the predetermined number (S201, No), the GC unit 146 terminates the host write period (S203). When the host write unit 145 is executing the host write, the GC unit 146 terminates the host write period after the host write being executed is completed. When the host write period is already finished, the GC unit 146 skips the processing of S203.

In the loop processing of S205 to S207, the GC unit 146 distributes the number of free blocks 17e provided in the NAND memory 10 to each thread for the sake of convenience. More specifically, the GC unit 146 calculates the total value of the size of the logical address space of the name space corresponding to the thread and the over-provisioning capacity of the thread. Then the GC unit 146 converts the total value into the number of blocks by dividing the total value by the block size. The number of blocks converted with regard to the thread i is denoted as a permissible number of blocks $AB_i$. In a case where all of the user capacity of the memory system 1 and all of the over-provisioning capacity of the memory system 1 are allocated to some thread, the value obtained by adding the permissible number of blocks $AB_i$ for all the threads is equal to the number of blocks provided in the NAND memory 10 and used for the storage of the user data (more specifically, the number corresponding to the physical capacity of the memory system 1). In a realistic situation, not all, but some of the user capacity of the memory system 1 is considered to be allocated to each thread. The non-allocated portion of the user capacity of the memory system 1 may be added to the over-provisioning capacity of the memory system 1. Then, all the over-provisioning capacity may be allocated to each thread. In such situation, the value obtained by adding the permissible number of blocks $AB_i$ for all the threads is equal to the number corresponding to the physical capacity of the memory system 1. The GC unit 146 subtracts the number of blocks $UB_i$ used in the thread i from the permissible number of blocks $AB_i$ of the thread i. The number of blocks in use $UB_i$ is explained in a later paragraph. The value obtained from subtraction is denoted as a number of distributed free blocks $FB_i$. The value obtained by adding the number of distributed free blocks $FB_i$ of all the threads is equal to the number of free blocks 17e provided in the NAND memory 10. The permissible number of blocks corresponds to an upper limit number of the blocks in use in each thread if all the over-provisioning capacity of the memory system 1 is distributed to some thread. More specifically, the GC unit 146 controls the number of blocks in use in each thread by the garbage collection so that it is not more than the permissible number of blocks $AB_i$ of each thread.

The GC unit 146 initializes the index i used in the loop processing of S205 to S207 with "1" (S204). Then, the GC unit 146 calculates the number of distributed free blocks $FB_i$ of the thread i (S205). $FB_i$ is calculated according to Expression 1 and Expression 2 explained below.

$$FB_i = AB_i - UB_i \quad \text{(Expression 1)}$$

$$AB_i = (UC_i + OPC_i)/BS \quad \text{(Expression 2)}$$

Here, $UC_i$ denotes the size of the logical address space of the name space #i (hereinafter referred to as a logical address space of the thread i). $OPC_i$ denotes the over-provisioning capacity of the thread i. BS denotes the size of a single block. $UB_i$ denotes the number of blocks in use in the thread i. The i-th input block 17ai, the i-th active block 17bi, the i-th source block 17ci, and the i-th destination block 17di correspond to blocks in use.

The GC unit 146 determines whether the value of i is equal to "N" or not (S206). When the value of i is determined not to be equal to "N" (S206, No), the GC unit 146 increases the value of i by "1" (S207), and executes the processing of S205 again. When the value of i is determined to be equal to "N" (S206, Yes), the GC unit 146 selects one of all the threads of which $FB_i$ is the least (hereinafter referred to as a thread j) (S208). Which of the threads of which $FB_i$ is the minimum is selected in a case where there are multiple threads of which $FB_i$ is the minimum may be designed in any way.

The processing of S208 is processing for selecting a thread for execution target of the garbage collection. The GC unit 146 executes the determination processing of S201 in a case where a free block 17e is generated by the garbage collection and in a case where the number of free blocks 17e is decreased, and when the number of free blocks 17e is equal to or more than the predetermined value, the host write period is started. The GC unit 146 executes the garbage collection on a thread of which $FB_i$ is particularly small while controlling the number of free blocks 17e so that it stays around a predetermined value, and therefore, FB of each thread is controlled so that FB of each thread becomes substantially the same as the value obtained by dividing the predetermined value by the number of threads.

Subsequent to the processing of S208, the GC unit 146 selects a single j-th active block 17bj as the j-th source block 17cj (S209). For example, the GC unit 146 selects a j-th active block 17bj storing the least quantity of valid data from among the j-th active blocks 17bj recorded in the j-th active block list 164j. The block management unit 147 changes the j-th active block 17bj selected in the processing of S209 to the j-th source block 17cj (S210). More specifically, the block management unit 147 deletes the identification information about the blocks selected in the processing of S209 (block set as the j-th active block 17bj) from the j-th active block list 162j, and records the identification information about the block selected in the processing of S209 to the j-th GC information 164j as the identification information indicating a j-th source block 17cj.

The block management unit 147 determines whether the j-th destination block 17dj has a vacant page or not (S211). When the j-th destination block 17dj does not have any vacant page (S211, No), the block management unit 147 changes the j-th destination block 17dj to a j-th active block 17bj (S212). More specifically, the block management unit 147 records the identification information about the block having been regarded as the j-th destination block 17dj to the j-th active block list 162j, and deletes the identification information about the block having been regarded as the j-th destination block 17dj from the j-th GC information 164j.

Subsequently, the block management unit 147 selects a single free block 17e (S213), and sets the selected free block 17e as a j-th destination block 17dj (S214). More specifically, the block management unit 147 deletes the identification information about the block selected in the processing of S213 (block having been regarded as the free block 17e) from the free block list 166, and executes the erase processing on the block selected in the processing of S213. Then, the block management unit 147 records the identification information about the block selected in the processing of S213 to the j-th GC information 164j as the identification information indicating a j-th destination block 17dj.

In a case where the j-th destination block 17dj includes a vacant page (S211, Yes), or after the processing of S214, the GC unit 146 copies valid data from the j-th source block 17cj to the j-th destination block 17dj (S215). The copying of the data is executed via the GC buffer 167. More specifically, the GC unit 146 reads the valid data from the j-th source block 17cj to the GC buffer 167, and thereafter, writes the data in the GC buffer 167 to the j-th destination block 17dj. The processing for writing the data in the GC buffer 167 to the j-th destination block 17dj may be referred to as GC write. In the processing of S211, for example, data of the unit size is copied.

In a case where there exists a vacant page in the j-th destination block 17dj (S211, No), or after the processing of S215, the GC unit 146 determines whether the j-th source block 17cj includes valid data that has not yet been copied (S216). When the j-th source block 17cj is determined to include valid data that has not yet been copied (S216, Yes), the GC unit 146 executes the processing of S211 on the valid data that has not yet been copied. When the j-th source block 17cj is determined not to include valid data that has not yet been copied (S216, No), the block management unit 147 changes the j-th source block 17cj to a free block (S217). More specifically, the block management unit 147 deletes the identification information about the block having been regarded as the j-th source block 17cj from the j-th GC information 164j, and records the identification information about the block having been regarded as the j-th source block 17cj to the free block list 166. After the processing of S217, the GC unit 146 executes the processing of S201 again.

Figure 8:
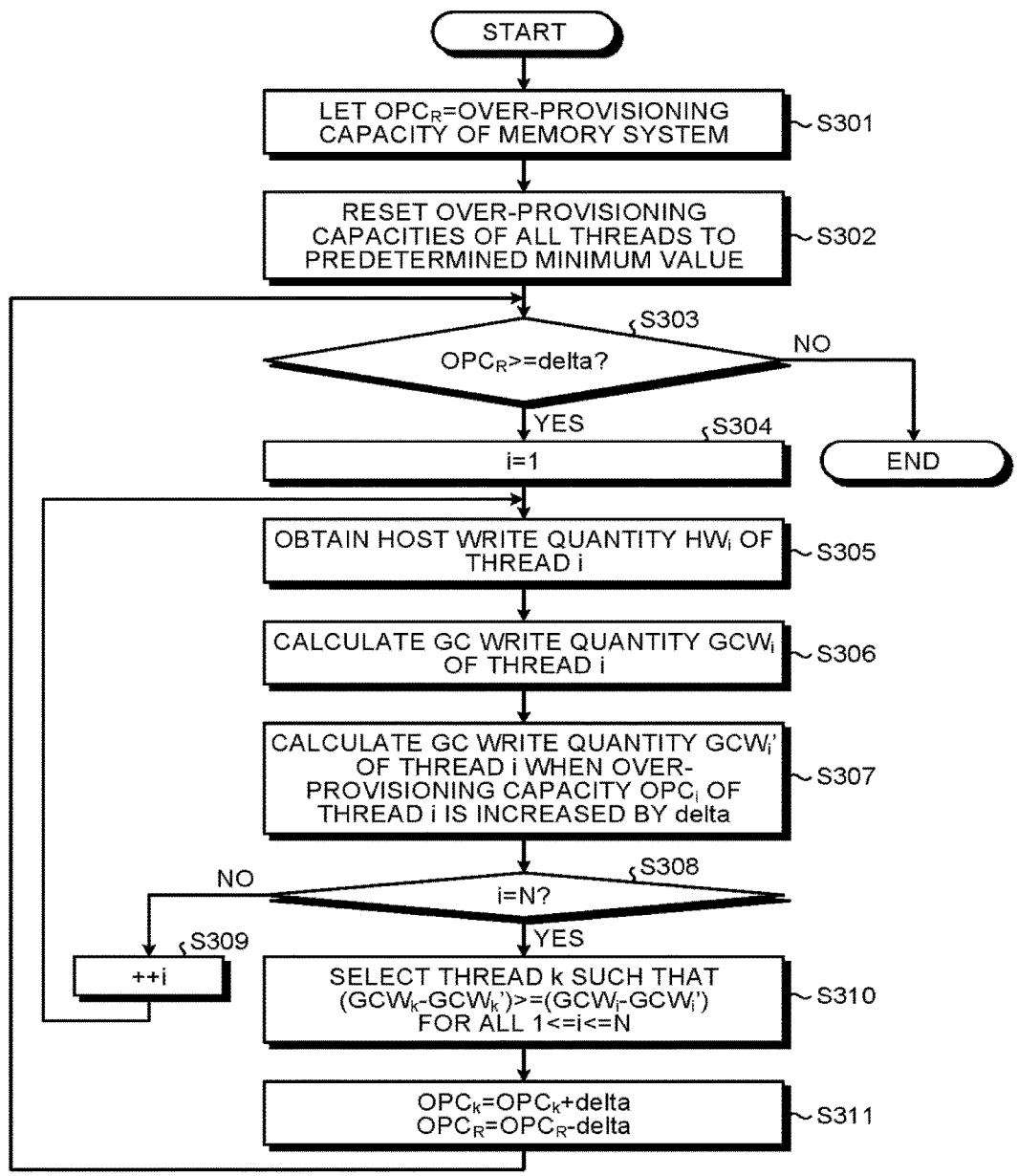
FIG. 8 is a flowchart for explaining processing for distributing an over-provisioning capacity of the memory system to each thread.

FIG. 8 is a flowchart for explaining processing for distributing the over-provisioning capacity of the memory system 1 to each thread. The processing of FIG. 8 is executed, e.g., in a case where there is a change in the number of threads provided in the memory system 1, in a case where there is a change in the size of the logical address space of one of one or more threads provided in the memory system 1, or in a case where there is a change in the over-provisioning capacity of the memory system 1. The processing of FIG. 8 may also be applied in a case where there is a change in the balance of the host write quantity of each thread or a change in the randomness of the write access.

First, the adjustment unit 143 substitutes the over-provisioning capacity of the memory system 1 into $OPC_R$ (S301). $OPC_R$ represents the over-provisioning capacity that has not yet been distributed. The adjustment unit 143 resets the over-provisioning capacities of all the threads to the predetermined minimum value (S302). More specifically, the adjustment unit 143 writes a predetermined minimum value to first over-provisioning capacity information 1651 and second over-provisioning capacity information 1652 in an overwriting manner. $OPC_R$ is reduced by N*(the predetermined minimum value).

Subsequently, the adjustment unit 143 determines whether the value of $OPC_R$ is more than or equal to delta or not (S303). The delta is a very small quantity defined in advance. In the subsequent processing, the adjustment unit 143 determines a thread to which the over-provisioning capacity is distributed by the delta. The delta is, for example, the same as the size of a single block.

When the value of $OPC_R$ is more than or equal to the delta (S303, Yes), the adjustment unit 143 initializes the index i used in the processing of FIG. 8 with "1" (S304). Then, the adjustment unit 143 obtains the host write quantity $HW_1$ of the thread i from the statistics unit 144 (S305). Then, the adjustment unit 143 estimates the GC write quantity $GCW_i$ of the thread i on the basis of the $HW_i$ (S306). It should be noted that the GC write quantity is the quantity of data written to the NAND memory 10 by the GC write.

$GCW_i$ is, for example, estimated as follows. First, the adjustment unit 143 calculates the over-provisioning percentage $OP_i$ of the thread i. $OP_i$ is obtained by dividing the over-provisioning capacity $OPC_i$ of the thread i by the size $UC_i$ of the logical address space of the thread i. The adjustment unit 143 stores a relation between the over-provisioning percentage and the write ratio in advance. The adjustment unit 143 stores the relation between the over-provisioning percentage and the write ratio as a function or a look-up table format, for example. The adjustment unit 143 uses the relation to calculate the write ratio corresponding to $OP_i$ (the write ratio of the thread i). The adjustment unit 143 multiplies the host write quantity of the thread i measured by the statistics unit 144 by the calculated write ratio, thereby obtaining an estimated value of $GCW_i$.

Subsequent to the processing of S306, the adjustment unit 143 estimates a GC write quantity $GCW_i'$ of the thread i if the delta is added to the over-provisioning capacity $OPC_i$ of the thread i (S307). Then, the adjustment unit 143 determines whether the value of i is equal to "N" or not (S308). When the value of i is determined not to be equal to "N" (S308, No), the adjustment unit 143 increases the value of i by "1" (S309), and thereafter, executes the processing of S305 again. When the value of i is determined to be equal to "N" (S308, Yes), the adjustment unit 143 selects a thread in which the value obtained by subtracting $GCW_i'$ from $GCW_i$ is the maximum (hereinafter referred to as a thread k) (S310). Which of the threads in which the value obtained by subtracting $GCW_i'$ from $GCW_i$ is the maximum is selected in a case where there are multiple threads in which the value obtained by subtracting $GCW_i'$ from $GCW_i$ is the maximum may be designed in any way.

The adjustment unit 143 adds the delta to the over-provisioning capacity $OPC_k$ of the thread k, and subtracts the delta from the over-provisioning capacity $OPC_R$ that has not yet been distributed (S311). The adjustment unit 143 records the added $OPC_k$ to k-th over-provisioning capacity information 165k in an overwriting manner.

The adjustment unit 143 executes the determination processing of S303 again after the processing of S311. When the value of $OPC_R$ is less than or equal to the delta (S303, No), the processing of distribution of the over-provisioning capacity of the memory system 1 is terminated.

Figure 9:
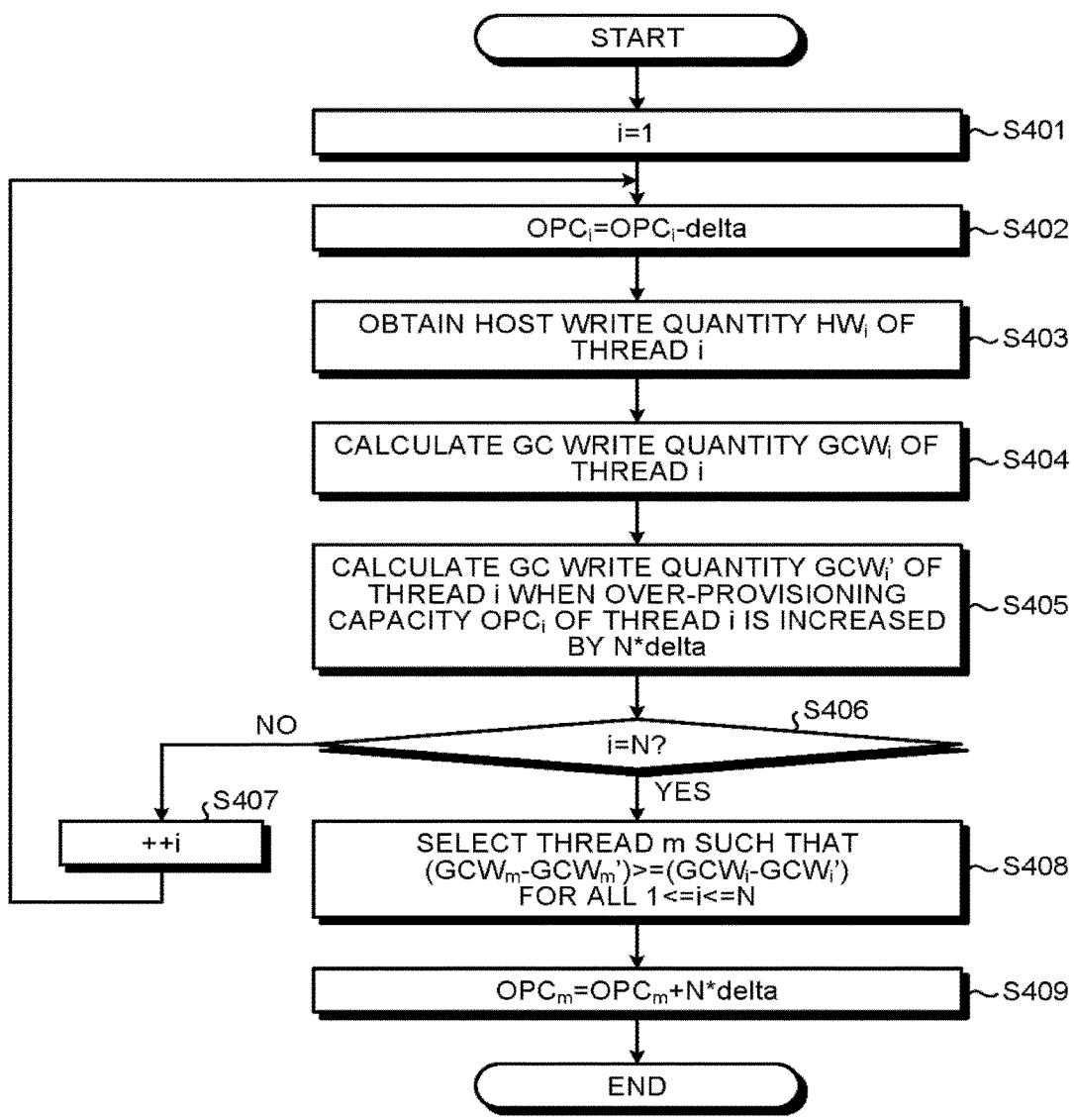
FIG. 9 is a flowchart for explaining processing for adjusting the over-provisioning capacity of each thread.

FIG. 9 is a flowchart for explaining processing for adjusting the over-provisioning capacity of each thread. The adjustment of the over-provisioning capacity of each thread is executed after the distribution of the over-provisioning capacity of the memory system 1. The adjustment of the over-provisioning capacity of each thread is executed, e.g., in a case where there is a change in the balance of the host write quantity of each thread or a change in the randomness of the write access. The adjustment of the over-provisioning capacity of each thread is executed may be performed with a regular interval of time.

First, the adjustment unit 143 initializes the index i used in the processing of FIG. 9 with "1" (S401). Then, the adjustment unit 143 subtracts the delta from the over-provisioning capacity $OPC_i$ of the thread i (S402). The adjustment unit 143 records the $OPC_i$ updated through subtraction to the i-th over-provisioning capacity information 165i in an overwriting manner.

Subsequently, the adjustment unit 143 obtains the host write quantity $HW_i$ of the thread i from the statistics unit 144 (S403). Then, the adjustment unit 143 estimates the GC write quantity $GCW_i$ of the thread i on the basis of $HW_i$ (S404). The adjustment unit 143 estimates the GC write quantity $GCW_i'$ of the thread i if N*delta (in this case, N=2) is added to the over-provisioning capacity $OPC_i$ of the thread i (S405). Then, the adjustment unit 143 determines whether the value of i is equal to "N" or not (S406). When the value of i is determined not to be equal to "N" (S406, No), the adjustment unit 143 increases the value of i by "1" (S407), and thereafter, executes the processing of S402 again.

When the value of i is determined to be equal to "N" (S406, Yes), the host write unit 145 selects a thread in which the value obtained by subtracting $GCW_i$ from $GCW_i'$ is the maximum (hereinafter referred to as a thread m) (S408). Which of the threads in which the value obtained by subtracting $GCW_i'$ from $GCW_i$ is the maximum is selected in a case where there are multiple threads in which the value obtained by subtracting $GCW_i'$ from $GCW_i$ is the maximum may be designed in any way.

The adjustment unit 143 adds N*delta to the over-provisioning capacity $OPC_m$ of the thread m (S409). The adjustment unit 143 records the updated $OPC_m$ as the m-th over-provisioning capacity information 165m in an overwriting manner. After the processing of S409, the processing of the adjustment of the over-provisioning capacity of the memory system 1 is finished. It should be noted that in a case where there are multiple threads in which the value obtained by subtracting $GCW_i'$ from $GCW_i$ is the maximum, the capacity of total N*delta may be distributed to the over-provisioning capacities of each thread in which the value obtained by subtracting $GCW_i'$ from $GCW_i$ is the maximum in such a manner that the quantity of distribution for each thread becomes equal.

In the above explanation, the memory controller 11 identifies data groups in accordance with the name spaces, but the method for identifying the data groups is not limited thereto. For example, the logical address space of the memory system 1 may be divided into multiple partitions (logical address ranges separated from each other), and the memory system 1 may has a data group for each partition. For another example, the memory controller 11 identifies the write-destination partition on the basis of the address included in the write command, and identifies the write-destination thread on the basis of the identified partition.

Each host 2 may transmit information indicating the data group together with the write command or before the write command or after the write command, and the memory controller 11 may identify the data group of the write-destination of the data on the basis of information received from each host 2. The memory system 1 may have a thread for each host 2, and the memory controller 11 may identify the data group on the basis of the host 2 of the initiator of the write command. For example, the host 2a accesses the name space #1, and in a case where the host 2b accesses the name space #2, the memory controller 11 classifies the data from the host 2a into the first data group 1101, and classifies the data from the host 2b into the second data group 1102.

The memory controller 11 may manage the thread so that two or more data groups share a single thread.

The number of threads provided in the memory system 1 is not limited to two. In accordance with a command from the outside (for example, the host 2), the memory controller 11 may generate a new thread, or delete an existing thread. The logical address space of each thread may be changed by a command from the outside (for example, the host 2). Similarly, in accordance with a command from the outside, the memory controller 11 may generate a new data group, or delete an existing data group.

The adjustment unit 143 may store the relation between the over-provisioning capacity and the write ratio for each randomness of write access. The randomness of the write access means the degree of continuity of the logical address designated by multiple write commands. In other words, the randomness of the write access is randomness of logical address of each data group. For example, the randomness in a case where multiple write commands are issued so that the range of the write-destination logical address is continuous is less than the randomness in a case where multiple write commands are issued so that the range of the write-destination logical address is not continuous. More specifically, the randomness of the sequential write access is less than the randomness of the random write access. The statistics unit 144 measures the randomness for each data group. The adjustment unit 143 calculates the estimated value of the GC write quantity on the basis of the measured randomness.

As described above, according to the first embodiment, the memory controller 11 controls at least two threads. Each thread is constituted by one or more blocks. The memory controller 11 receives inputs of at least two data groups, and stores the received two data groups to respectively different threads. More specifically, the memory controller 11 stores the first data group to the first block group, and stores the second data group to the second block group. The memory controller 11 calculates the permissible number of blocks for each thread, and executes the garbage collection on a thread in which the value obtained by subtracting the number of blocks in use from the permissible number of blocks is the least. More specifically, the memory controller 11 controls the number of blocks constituting the first block group so that the number of blocks constituting the first block group is not more than the permissible number of blocks of the first block group (first value). The memory controller 11 controls the number of blocks constituting the second block group so that the number of blocks constituting the second block group is not more than the permissible number of blocks of the second block group (second value). The block group of the storage destination is classified according to data group, and the garbage collection is executed for each block group, so that the NAND memory 10 can be operated by using the write ratio that is independent from each block group. The memory controller 11 appropriately controls the permissible number of blocks for each block group, so that the GC write quantity of the entire memory system 1 with respect to the host write quantity of the entire memory system 1 can be reduced.

The memory controller 11 controls the permissible number of blocks as follows, for example. More specifically, the memory controller 11 sets the over-provisioning capacity for each thread, and calculates the permissible number of blocks for each thread on the basis of the over-provisioning capacity for each thread. The over-provisioning capacity for each thread is the over-provisioning capacity allocated to each thread of the over-provisioning capacity of the entire memory system 1. The memory controller 11 calculates the permissible number of blocks for each thread on the basis of the over-provisioning capacity for each thread.

Further, the memory controller 11 measures the host write quantity for each thread (input quantity for each data group). Then, the memory controller 11 calculates the over-provisioning capacity for each thread on the basis of the host write quantity for each thread. Therefore, the memory controller 11 can adjust the permissible number of blocks in accordance with the host write quantity for each thread.

Further, the memory controller 11 calculates the GC write quantity for each thread on the basis of the host write quantity for each thread, and calculates the over-provisioning capacity for each thread on the basis of the summation of the GC write quantity for each thread. The memory controller 11 calculates the over-provisioning capacity for each thread so that the summation of the GC write quantity for each thread becomes as small as possible. Therefore, the memory controller 11 can reduce the GC write quantity of the entire memory system 1.

In the above explanation, for example, the memory controller 11 changes the over-provisioning capacity for each thread little by little. The memory controller 11 executes processing for calculating, with regard to all the threads, processing for calculating the quantity of change of the GC write quantity of the entire memory system 1 before and after the change of the over-provisioning capacity for each thread, and changes the over-provisioning capacity for each thread so that the GC write quantity of the entire memory system 1 becomes the least. Any method may be used to calculate the over-provisioning capacity for each thread as long as it is a method that can most greatly reduce the GC write quantity of the entire memory system 1.

Further, the memory controller 11 stores a relation between the over-provisioning percentage and the write ratio in advance, calculates the write ratio for each thread by using the relation, and calculates the GC write quantity for each thread by using the write ratio for each thread. Therefore, the memory controller 11 can estimate the GC write quantity for each thread on the basis of the over-provisioning capacity for each thread.

Further, the memory controller 11 dynamically executes the change of the permissible number of blocks for each thread. Therefore, even when there is a change in the host write quantity for each thread, the memory controller 11 can adjust the permissible number of blocks for each thread again so that the GC write quantity of the entire memory system 1 becomes as small as possible.

Second Embodiment

Figure 10:
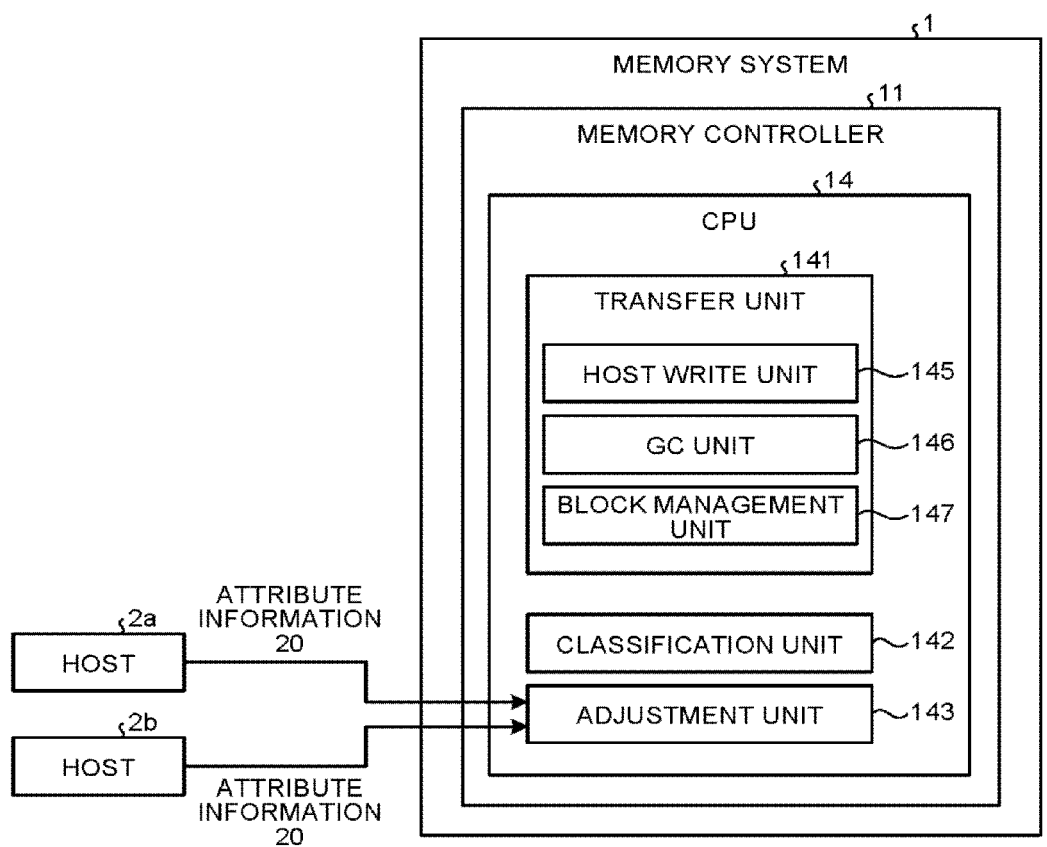
FIG. 10 is a diagram illustrating a configuration example of a memory system according to a second embodiment.

In the second embodiment, the memory controller 11 can receive an information about host write quantity for each data group from the outside. FIG. 10 is a diagram illustrating a configuration example of a memory system 1 according to the second embodiment. In FIG. 10, the same constituent elements as those in the memory system 1 according to the first embodiment are not shown.

As shown in FIG. 10, the memory system 1 according to the second embodiment has a configuration in which the statistics unit 144 is omitted from the memory controller 11. The adjustment unit 143 can receive an attribute information 20 from each host 2. For example, the attribute information 20 is input into the memory system 1 as a command, and the adjustment unit 143 obtains the received attribute information 20. The attribute information 20 includes the host write quantity for each data group by the host 2 of the initiator of the attribute information 20. More specifically, each host 2 transmits the quantity of data planned to be written to an access destination data group within a certain period of time to the adjustment unit 143 as the attribute information 20. When a single host 2 can initiate write commands designated for multiple data groups, the attribute information 20 may be configured to include information for identifying the access destination data group (for example, a name space ID). When a single host 2 accesses only a single data group, the attribute information 20 does not include any information for identifying the data group, and the adjustment unit 143 may identify which data group the host write quantity included in the attribute information 20 pertains to, on the basis of the host 2 of the initiator of the attribute information 20.

The adjustment unit 143 executes the processing for distributing the over-provisioning capacity of the memory system 1 to each thread and the processing for adjusting the over-provisioning capacity of each thread on the basis of the host write quantity obtained from the attribute information 20 instead of the host write quantity measured by the statistics unit 144. The adjustment unit 143 may execute the processing for adjusting the over-provisioning capacity of each thread every time receiving the attribute information 20 from any one of multiple hosts 2. The adjustment unit 143 may prompt each host 2 to transmit the attribute information 20.

It should be noted that the attribute information 20 may include randomness of an access pattern for each thread by the host 2 of the initiator of the attribute information 20. The adjustment unit 143 stores, in advance, the relation between the over-provisioning capacity and the write ratio for each randomness of write access. The adjustment unit 143 selects a relation used for calculation of the write ratio from among the multiple relations on the basis of the randomness included in the received attribute information 20.

Figure 11:
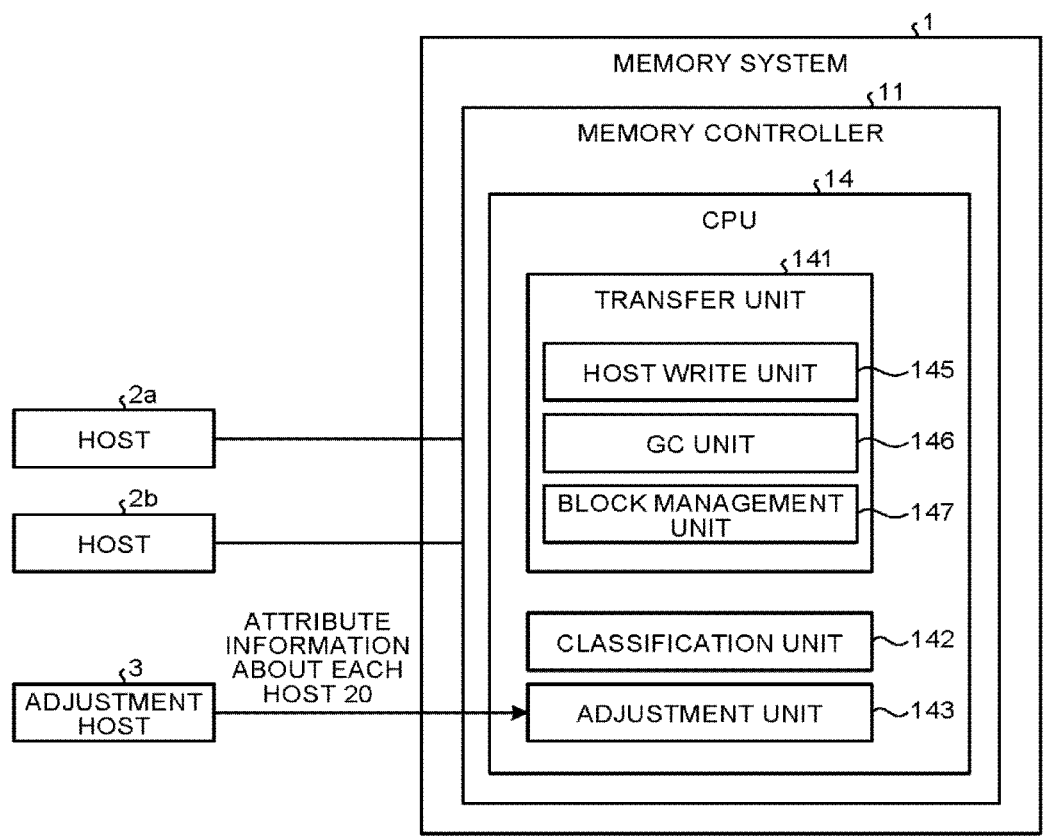
FIG. 11 is a diagram illustrating another configuration example of a memory system according to the second embodiment.

In the above explanation, each host 2 transmits the attribute information 20. As shown in FIG. 11, in contrast, the memory system 1 may be connected to not only multiple hosts 2 but also an adjustment host 3, and may receive the attribute information 20 of each host 2 from the adjustment host 3.

Figure 12:
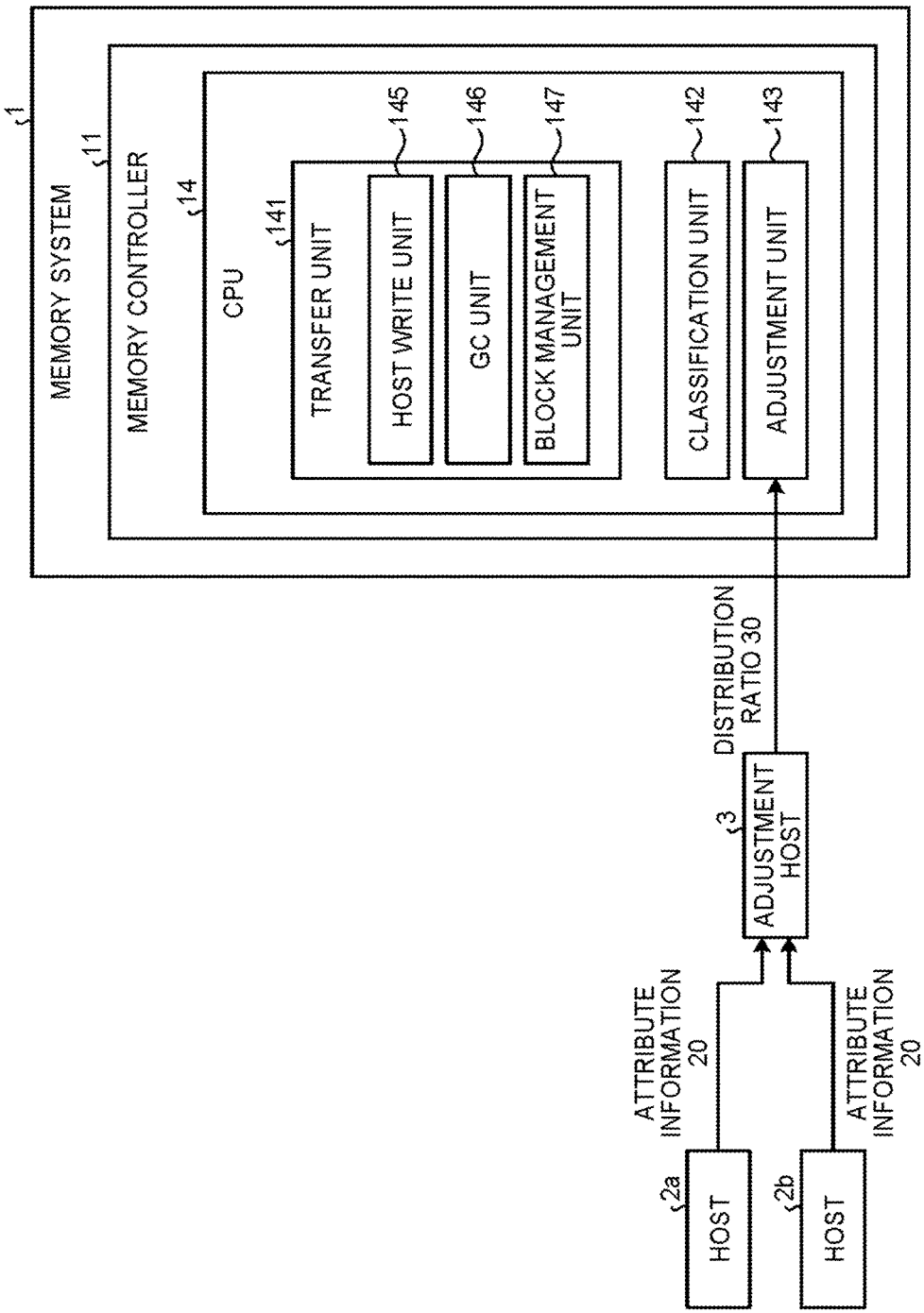
FIG. 12 is a diagram illustrating another configuration example of a memory system according to the second embodiment.

As shown in FIG. 12 as yet another configuration, the adjustment host 3 may receive the attribute information 20 from each host 2, and may calculate a distribution ratio 30 of the over-provisioning capacities for each thread on the basis of the attribute information 20 of each host 2. The adjustment host 3 transmits the calculated distribution ratio 30 to the memory system 1. The adjustment unit 143 calculates the over-provisioning capacity for each thread so that the ratio of the over-provisioning capacity for each thread matches the distribution ratio received from the adjustment host 3.

Third Embodiment

FIG. 13 is a diagram illustrating an implementation example of a memory system 1. For example, the memory system 1 is implemented in a server system 4. The server system 4 is configured such that a rack mount server 5 and a disk array 6 are connected by a communication interface 7. Any standard can be employed as a standard of the communication interface 7. The rack mount server 5 is configured by mounting one or more hosts 2 to a server rack. Multiple hosts 2 can access the disk array 6 via the communication interface 7. In the rack mount server 5, an adjustment host 3 may be further mounted.

The disk array 6 is configured by mounting one or more memory systems 1 to a server rack. Each memory system 1 can execute write command from each host 2. Each memory system 1 has such configuration that the first or second embodiment is employed. Therefore, each memory system 1 includes multiple threads, and can adjust the over-provisioning capacity for each thread so that the GC write quantity of the memory system 1 with respect to the host write quantity of the memory system 1 becomes as small as possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
    a memory that includes a plurality of blocks; and
    a controller configured to:
        receive a first data group and a second data group from a host;
        store the first data group dedicatedly to a first block group and store the second data group dedicatedly to a second block group, the first block group including one or more first blocks among the plurality of blocks, the second block group including one or more second blocks among the plurality of blocks, the first block group being different from the second block group, the first data group being a group of data requested by the host to be written to a first name space, the second data group being a group of data requested by the host to be written to a second name space different from the first name space;
        calculate a first value on the basis of a first over-provisioning capacity, the first over-provisioning capacity being an over-provisioning capacity allocated to the first block group from a total over-provisioning capacity of the memory system;
        control the storing of the first data group so that a number of the first blocks does not exceed the first value;
        calculate a second value on the basis of a second over-provisioning capacity, the second over-provisioning capacity being an over-provisioning capacity allocated to the second block group from the total over-provisioning capacity of the memory system; and
        control the storing of the second data group so that a number of the second blocks does not exceed the second value.

2. The memory system according to claim 1, wherein the controller sets the first over-provisioning capacity and the second over-provisioning capacity on the basis of a command given from the host.

3. The memory system according to claim 2, wherein
    the command includes an input quantity of the first data group and an input quantity of the second data group, and
    the controller calculates a setting value of the first over-provisioning capacity and a setting value of the second over-provisioning capacity on the basis of the input quantity of the first data group and the input quantity of the second data group.

4. The memory system according to claim 1, wherein the controller controls the number of the first blocks by performing garbage collection on the first block group, and controls the number of the second blocks by performing garbage collection on the second block group.

5. The memory system according to claim 4, wherein the controller calculates a first quantity on the basis of the input quantity of the first data group, the first quantity being a quantity of data copied to the first block group in the garbage collection, calculates a second quantity on the basis of the input quantity of the second data group, the second quantity being a quantity of data copied to the second block group in the garbage collection, and determines a setting value of the first over-provisioning capacity and a setting value of the second over-provisioning capacity on the basis of the first quantity and the second quantity.

6. The memory system according to claim 5, wherein the controller stores at least one relation between an over-provisioning percentage and a write ratio, the write ratio being a ratio between a quantity of data copied in garbage collection and an input quantity of data from the host, and calculates the first quantity and the second quantity by using the at least one relation, the over-provisioning percentage being a value obtained by dividing an over-provisioning capacity by a size of a name space.

7. The memory system according to claim 6, wherein
the at least one relation comprises a plurality of second relations,
the controller sets the first over-provisioning capacity and the second over-provisioning capacity on the basis of a command given from the host,
the command including first information regarding randomness of addresses of the first data group and second information regarding randomness of addresses of the second data group, and
the controller selects a third relation according to the first information among the plurality of second relations, selects a fourth relation according to the second information among the plurality of second relations, calculates the first quantity by using the third relation and calculates the second quantity by using the fourth relation.

8. The memory system according to claim 1, wherein the controller:
calculates, on the basis of a size of the first name space and a candidate value of the first over-provisioning capacity, an over-provisioning percentage of the first block group;
calculates, on the basis of a first relation and the over-provisioning percentage of the first block group, the first quantity;
calculates, on the basis of a size of the second name space and a candidate value of the second over-provisioning capacity, an over-provisioning percentage of the second block group; and
calculates, on the basis of a second relation and the over-provisioning percentage of the second block group, the second quantity,
the first relation being a relation between an over-provisioning percentage and a first write ratio, the second relation being a relation between an over-provisioning percentage and a second write ratio, the first write ratio and the second write ratio each being a ratio between a quantity of data copied in garbage collection and an input quantity of data from the host.

9. The memory system according to claim 2, wherein
the command includes first information regarding randomness of addresses of the first data group and second information regarding randomness of addresses of the second data group, and
the controller calculates a setting value of the first over-provisioning capacity and a setting value of the second over-provisioning capacity on the basis of the first information and the second information.

10. The memory system according to claim 2, wherein
the command includes a ratio between the first over-provisioning capacity and the second over-provisioning capacity, and
the controller calculates a setting value of the first over-provisioning capacity and a setting value of the second over-provisioning capacity on the basis of the ratio.

11. The memory system according to claim 1, wherein
the controller determines whether data received from the host belongs to the first data group or the second data group on the basis of an address of the data received from the host.

12. The memory system according to claim 1, wherein the controller measures an input quantity of the first data group and an input quantity of the second data group, and calculates a setting value of the first over-provisioning capacity and a setting value of the second over-provisioning capacity on the basis of the input quantity of the first data group and the input quantity of the second data group.

13. The memory system according to claim 12, wherein the controller controls the number of first blocks by performing garbage collection on the first block group, and controls the number of second blocks by performing garbage collection on the second block group.

14. The memory system according to claim 13, wherein the controller calculates a first quantity on the basis of the input quantity of the first data group, the first quantity being a quantity of data copied to the first block group in the garbage collection, calculates a second quantity on the basis of the input quantity of the second data group, the second quantity being a quantity of data copied to the second block group in the garbage collection, and determines a setting value of the first over-provisioning capacity and a setting value of the second over-provisioning capacity on the basis of the first quantity and the second quantity.

15. The memory system according to claim 14, wherein the controller stores at least one relation between an over-provisioning percentage and a write ratio, the write ratio being a ratio between a quantity of data copied in garbage collection and an input quantity of data from the host, and calculates the first quantity and the second quantity by using the at least one relation, the over-provisioning percentage being obtained by dividing an over-provisioning capacity by a size of a name space.

16. The memory system according to claim 15, wherein
the at least one relation comprises a plurality of second relations, and
the controller further
measures first randomness of addresses of the first data group and second randomness of addresses of the second data group,
selects a third relation according to the first randomness among the plurality of second relations,
selects a fourth relation according to the second randomness among the plurality of second relations,
calculates the first quantity by using the third relation, and
calculates the second quantity by using the fourth relation.

17. The memory system according to claim 1, wherein the controller measures first randomness of addresses of the first data group and second randomness of addresses of the second data group, and calculates a setting value of the first over-provisioning capacity and a setting value of the second over-provisioning capacity on the basis of the first randomness and the second randomness.

18. The memory system according to claim 1, wherein the controller dynamically adjusts the first value and the second value.

19. The memory system according to claim 1, wherein the first over-provisioning capacity and the second over-provisioning capacity are respectively distributed from the total over-provisioning capacity of the memory system.

20. A memory system, comprising:
a memory that includes a plurality of blocks; and
a controller configured to:
receive a first data group and a second data group from host;
store the first data group dedicatedly to a first block group and store the second data group dedicatedly to a second block group, the first block group including one or more first blocks among the plurality of blocks, the second block group including one or more second blocks among the plurality of blocks, the first block group being different from the second block group, the first data group being a group of data requested by the host to be written to a first range of a logical address, the second data group being a group of data requested by the host to be written to a second range of a logical address, the first range being different from the second range;
calculate a first value on the basis of a first over-provisioning capacity, the first over-provisioning capacity being an over-provisioning capacity allocated to the first block group from a total over-provisioning capacity of the memory system;
control the storing of the first data group so that a number of the first blocks does not exceed the first value;
calculate a second value on the basis of a second over-provisioning capacity, the second over-provisioning capacity being an over-provisioning capacity allocated to the second block group from the total over-provisioning capacity of the memory system; and
control the storing of the first data group so that a number of the second blocks does not exceed a second value.

21. The memory system according to claim 20, wherein the first over-provisioning capacity and the second over-provisioning capacity are respectively distributed from the total over-provisioning capacity of the memory system.

* * * * *